3,560,561
CARBONYLATION OF ALLYLIC HALIDES, PHEN-
YLHALIDES AND BENZYL HALIDES IN THE
PRESENCE OF ORGANOMETALLIC CATALYTIC
AGENTS
John A. Scheben, Erlanger, Ky., and Irving L. Mador
and Milton Orchin, Cincinnati, Ohio, assignors to
National Distillers and Chemical Corporation, New
York, N.Y.
No Drawing. Filed July 17, 1967, Ser. No. 654,946
Int. Cl. C07c 51/58
U.S. Cl. 260—544          7 Claims

ABSTRACT OF THE DISCLOSURE

This invention relates to improved methods of carbony-
lating, dimerizing, hydrogenating and/or isomerizing vari-
ous unsaturated organic compounds which comprises per-
forming the desired chemical reaction in the presence of a
small but effective amount of an organometallic catalytic
agent of the formula:

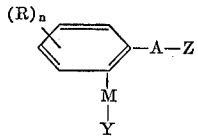

wherein $n$ is an integer from 0 to 4; each R is alkyl, aryl,
hydroxy, alkoxy, aryloxy, nitro, halo, or a secondary alkyl
or arylamino; M is ruthenium, platinum, osmium, palla-
dium, iridium, or rhodium; Y is halide, nitrate, acetate,
thiocyanate or cyanide; A is —CR'=N—, (wherein R' is
hydrogen, alkyl or aryl), —NH—NH—,

or —N=N—; and Z is alkyl, aryl, R-substituted aryl,
(wherein R is as defined hereinabove), alkaryl, alkoxy,
aryloxy, hydroxy, alkyl amino, dialkyl amino, aryl amino
or diarylamino.

---

This invention relates to improved chemical reactions
utilizing organometallic catalysts. More particularly, the
invention pertains to chemical reactions wherein the cata-
lyst is an aromatic organometallic complex with phenyl or
R-substituted phenyl groups and having the formula:

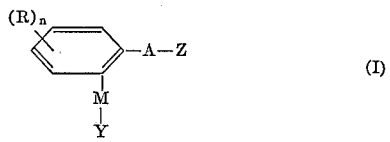   (I)

wherein:
(a) $n$ is an integer from zero to four;
(b) R is a lower alkyl group having from 1 to 4 carbon
atoms, such as methyl, ethyl, t-butyl, etc.; and aryl group
having from 6 to 10 carbon atoms such as phenyl, tolyl,
cumyl, naphthyl, etc.; a hydroxy group; a nitro group; a
halide, such as chloride or bromide; a secondary alkyl or
arylamino group having 2 to 12 carbon atoms such as di-
methylamino, diethylamino, diphenylamino, methylphenyl-
amino etc.; or an alkoxy or arylokoxy or aryloxy group
having from 1 to 6 carbon atoms such as methoxy, 1-bu-
toxy, or phenoxy, etc.;
(c) M is ruthenium, platinum, osimium, palladium,
iridium, or rhodium;
(d) Y is chloride, bromide, nitrate, acetate, thiocyanate,
or cyanide groups;
(e) A is —CR'=N— (wherein R' is hydrogen, a lower
alkyl or aryl group having from 1 to 10 carbon atoms
such as methyl, ethyl, propyl, etc.); —NH—NH—;

or —N=N—; and
(f) Z is a lower alkyl group having from 1 to 10 car-
bon atoms such as methyl, ethyl, hexyl, etc.; an aryl group
such as phenyl, which may carry R substituent groups as
above defined; an alkaryl group having from 7 to 10 car-
bon atoms such as benzyl, 2-phenylethyl, etc.; an alkoxy
or aryloxy group having from 1 to 10 carbon atoms such
as methoxy or phenoxy, etc.; hydroxy group; or an alkyl
or aryl amino group having from 1 to 12 carbon atoms,
such as methylamino, diethylamino, diphenylamino, etc.

Illustrative phenyl organometallic complexes encom-
passed by Formula I are as follows:

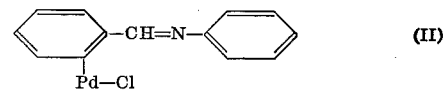   (II)

and

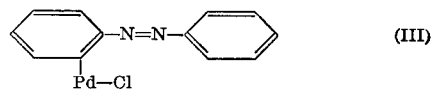   (III)

These complexes are designated as chloro[o-(N - phenyl-
formimidoyl)phenyl]palladium (II) and chloro(o - azo-
benzene)palladium(II), respectively. The organometallic
complexes may be prepared by utilizing, as the starting
material, a phenyl or substituted phenyl compound having
the formula:

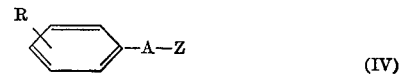   (IV)

wherein R, A, and Z are as above defined in Formula I.
The starting compound must have in the aromatic ring at
least one hydrogen atom positioned ortho to the A substitu-
ent. The starting compound for (II) and (III) are respec-
tively, N-benzylideneaniline and azobenzene. Other illus-
trative starting materials include inter alia, such com-
pounds as: hydrazobenzene, azoxybenzene, benzaldehyde
oxime, N - p - methoxybenzylidene - p-methoxy aniline,
N - benzylidene - 2 - hydroxy aniline, p-dimethylamino-
N-benzyldene-aniline, N - benzylidenemethylamine, 4,4'
azobis (N,N-dimethylaniline), o-phenylpyridine, and 4,4'-
azodiphenetole.

The organometallic complexes are prepared by react-
ing one of the above starting compounds with a Group
VIII noble metal or platinum group metal salt. Such salts
are exemplified by the following: palladium chloride, pal-
ladium nitrate, sodium chloropalladite, platinum chloride,
platinum bromide, osmium chloride, rhodium chloride,
ruthenium chloride, iridium chloride, or iridium bromide,
etc. The use of the platinum group metal halides is es-
pecially preferred.

The resulting organometallic complexes are encom-
passed by Formula I. When it is desired to obtain com-
plexes wherein Y is other than the anion of the original
platinum group metal salt, a further reaction is required.
More specifically, the metal organometallic complex, where
Y is chloride or bromide, is subsequently reacted with an
alkali metal salt such as sodium or potassium acetate,
cyanate, nitrate, thiocyanate and the like. Specific reac-
tants include, for example, sodium acetate, potassium
cyanate, or sodium nitrate, etc. In general, both the initial
reaction and the subsequent reaction are carried out at
ambient pressures and at temperatures which may range
from about room temperature up to about 125° C.

Although not essential, the aforedescribed syntheses or Y exchange reactions may be carried out in the presence of an inert solvent such as methanol, dioxane, dimethyl formamide, tetrahydrofuran, water, and the like.

The organometallic complexes of Formula I represent a sigma bonding between a carbon atom of the phenyl group and the metal atom. It has been found that in the complexes there exists coordinate bonding of the A group to the metal atom. The organometallic complex represented by Formula II thus takes the form:

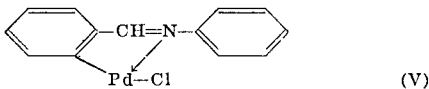
(V)

In accordance with another aspect of the present invention, the organometallic complexes may exist, especially as solids, in the dimeric form with weak electron bridging through the Y substitutents, as follows:

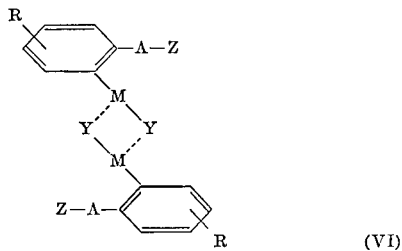
(VI)

wherein R, M, Y, and Z are as above defined.

A specific dimeric phenyl organometallic complex encompassed by Formula VI is as follows:

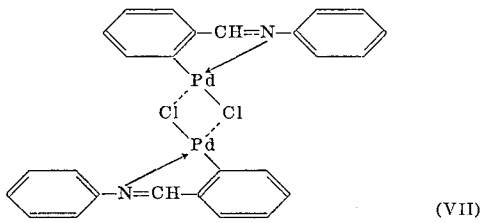
(VII)

This dimer is designated as dichlorobis[o-(N-phenylformimidoyl)phenyl]dipalladium (II) and shows coordination bonds between the metal atoms and the nitrogen atoms.

In another aspect of this invention complexes as represented by Formula I may be reacted with a ligand-forming compound as an amine, amide, nitrile, alkene, nitric oxide, dimethyl sulfoxide, hexamethylphosphoramide; as well as alkyl, cycloalkyl or aryl phosphine, stibene or arsine with formation of a coordinate bond to the noble metal. The resultant complexes are also useful in the practice of this invention.

In accordance with the present invention, it has been found that the aforedescribed phenyl and R-substituted phenyl organometallic complexes are effective catalysts for such chemical reactions as the carbonylation, dimerization, hydrogenation and isomerization of various unsaturated organic compounds. Each of these reactions will be described below illustrating the use of certain feed material and organometallic complexes. The reactions may be conducted in liquid or vapor phase.

As is well known, various unsaturated organic compounds, such as those enumerated below, can be carbonylated by reaction with carbon monoxide at temperatures within the range of about 50° to 350° C. and pressure of about 14 to 4500 p.s.i.g. Suitable unsaturated starting materials for the carbonylation reaction include:

(a) Allylic halides, especially chlorides and bromides such as allyl chloride to give 3-butenoyl chloride, beta-methallyl chloride to give 3-methyl-3-butenoyl chloride or crotyl chloride to give 3-pentenoyl chloride, etc.

(b) Aryl halides such as benzyl chloride to give phenyl acetyl chloride or chlorobenzene to give benzoyl chloride, etc.

(c) Unsaturated alcohols and ethers such as allyl alcohol to give allyl 3-butenoate, methallyl alcohol to give methallyl 3-methyl-3-butenoate, or allyl ether to give allyl 3-butenoate, etc. and (d) Olefins, such as ethylene to give 3-chloropropionyl chloride, or styrene to give 3-phenyl-3-chloropropionyl chloride, etc.

The dimerization reactions encompassed by the present invention include:

(a) the dimerization of unsaturated hydrocarbons such as alkenes having from 2 to 8 carbon atoms (e.g., ethylene, propylene, butene, styrene and the like) to produce the corresponding unsaturated compounds, (e.g. butene, hexene, octene, diphenylbutene, and the like), (b) the dimerization of unsaturated nitriles such as acrylonitrile to produce dehydroadiponitrile and methylene glutaronitrile, and (c) the dimerization of acrylic esters such as methyl acrylate to produce dimethyl dehydroadipate.

These dimerization reactions are generally carried out at temperatures within the range of about 50° to 150° C.

The hydrogenation of various unsaturated organic compound is another reaction wherein the above described organometallic complexes can be readily utilized. The hydrogenation is generally carried out at tempertures ranging from 25° to 150 ° C. and at hydrogen pressures of from 0 to 1500 p.s.i.g. Typical feed materials include alkenes having from 2 to 16 carbon atoms (e.g., ethylene, propylene, butene, octene, etc.), and the like. The resulting products are the corresponding saturated compounds.

The organometallic complexes may be further used as catalysts in the isomerization of various unsaturated organic compounds, such as, for example; allyl benzene, 3,4-dichlorobutene-1, octene-1, pentadiene-1,4, and the like. Isomerization reactions are generally conducted at temperatures of from about 25° to 150° C.

Only catalytically effective amounts of the organometallic complexes need be employed in carrying out the aforediscussed reactions. It will be understood, however, that the specific amount of catalyst used may vary widely depending in part upon the particular reaction being catalyzed. In general, the organometallic complex catalyst will be present in an amount which will range from about 0.001 to 10% by weight, and preferably from about 0.01 to 2%, based on the total weight of the reaction mixture.

The present invention will be more fully understood by reference to the following illustrative embodiments, wherein Example 1 is directed to preparation of various organometallic complexes.

EXAMPLE 1

(A) To 1.62 g. of palladium chloride to 50 ml. of tetrahydrofuran is added, with stirring, 1.86 g. of N-benzylidineaniline, and the reactants are stirred over a period of twenty hours at ambient temperature, and for an additional two hours at 50° C. During this period the color of the admixture changed from an initial red-brown to a light tan. The reaction mixture is then filtered and the recovered product is washed with methanol and diethyl ether and then dried to yield 2.7 g. of the final product which melts with recomposition at 252-254° C.

*Analysis.*—$C_{13}H_{10}ClNPd$: Theory: Pd, 33.2%. Found: Pd, 34.1%.

(B) A mixture of 2.08 g. of hydrazobenzene and 1.86 g. of palladium chloride in 110 ml. of methanol was stirred at ambient tmeperature under nitrogen for 22 hours. The precipitate was collected, washed thoroughly wtih methanol and diethyl ether, then dried. 3.0 g. of product is recovered which melts with decomposition between 283–285° C.

*Analysis.*—$C_{13}H_{11}ClN_2Pd$: Theory: Pd, 32.7%. Found: Pd, 32.7%.

(C) The following were stirred at room temperature overnight under nitrogen: 2.24 g. of N-benzylidenemethylamine, 1.79 g. of palladium chloride, and 80 ml. of tetrahydrofuran initial red-brown color gradually changed to a light tan. The reaction mixture was filtered and the precipitate was washed with tetrahydrofuran, methanol, and diethyl ether. After drying the product weighed 2.2 g., melting with decomposition at 243–244° C.

(D) A mixture of 1.022 g. of azoxybenzene and 0.854 g. of palladium chloride in 120 ml. of methyl alcohol was stirred at ambient temperature under nitrogen for 48 hours. The light yellow precipitate was collected, washed with methanol and diethyl ether, then dried under vacuum, yielding 1.3 g. of product having a decomposition point greater than 315° C.

Analysis.—$C_{12}H_9ClN_2OPd$: Theory: Pd, 31.3%. Found: Pd, 30.6%.

(E) Platinous chloride (4.0 mmoles) and hydrobenzamide (2.4 mmoles) were added to a solvent mixture composed of 40 ml. of methanol and 30 ml. of ethyl ether. The resulting mixture was stirred under nitrogen for 48 hours, yielding 0.6 g. of a light brown solid.

(F) To a solution of 5.25 mmoles of azobenzene in 100 ml. of methyl alcohol was added 4.02 mmoles of rhodium trichloride. The homogeneous solution was stirred under nitrogen for 72 hours. The solution was then concentrated, and the solid was treated with ethyl ether to remove unreacted azobenzene, then washed with petroleum ether and dried to yield 1.3 g. of a bright red solid which decomposed upon heating to 200–210° C.

(G) A mixture of 1.8 g. of azobenzene and 1.77 g. of palladium dichloride in 50 ml. of methanol was stirred at room temperature under nitrogen for three hours during which time a precipitate appeared. The mixture was filtered and the product thoroughly washed with methanol and diethyl ether, yielding 2.9 g. of product melting with decomposition at 278–280° C.

Analysis.—$C_{12}H_8ClN_2Pd$: Theory: Pd, 33.1%; Cl, 11.0%. Found: Pd, 33.4%; Cl, 11.9%.

(H) An excess of lithium bromide in 60 ml. of ethyl ether plus 10 ml. of methanol was stirred overnight at ambient temperature with 0.77 mmole of the product from Example 1(G), and the resultant precipitate was collected, washed with ethyl ether and dried.

EXAMPLE 2

About 0.12 mmole of the various palladium products of Example 1 with 62 mmoles of octene-1 in 50 ml. of ethyl acetate was shaken at ambient temperature under 3–4 atmospheres of hydrogen. The uptake of hydrogen was measured as a function of time and the results obtained are set forth in Table 1 below:

TABLE 1

| Catalyst: | Time for half hydrogenation |
|---|---|
| Palladium product of Example 1(A) | 18 min. |
| Palladium product of Example 1(B) | 30 min. |
| Palladium of Example 1(C) | 33 min. |
| Palladium product of Example 1(G) | 24 hours. |

EXAMPLE 3

To a 300 ml. stirred autoclave was charged allyl chloride 79.6 g. and azobenzene-palladium chloride complex of Example 1(G) 1.23 g. The reactor was closed and pressurized with carbon monoxide to 81 atmospheres. Finally, the reactor contents were stirred and heated at 95° C. for three hours under 100 atmospheres total pressure. At the end of this time the excess pressure was vented and the reaction mixture filtered. The filtrate was analyzed and found to contain 73% 3-butenoyl chloride.

EXAMPLE 4

3.9 mmoles of the palladium complex of N-benzylidenealine from Example 1(A) per 1.03 mmoles of allyl chloride were heated at 95° C. for 3 hours under a carbon monoxide pressure of 100 atmospheres in a stirred autoclave. Analysis indicated 67% conversion of allyl chloride to 3-butenoyl chloride.

EXAMPLE 5

A suspension of 0.147 g. of the complex of N-methoxybenzylidene p-methoxyaniline and palladium chloride in 7.9 g. of allyl chloride was heated at 95° C. for 3 hours under a pressure of 100 atmospheres of carbon monoxide. The 3-butenoyl chloride product was identified by gas chromatographic analysis; the conversion amounted to 42%. The initial complex was prepared in accordance with the procedure set forth in Example 1, except that an equivalent amount of N - p - methoxybenzylidene - p - methoxyaniline is substituted for N-benzylideneaniline.

EXAMPLE 6

A suspension of 0.887 g. of azobenzene-palladium chloride complex as prepared in Example 1(G) in 90.4 g. of beta-methallyl chloride was stirred and heated at 90° C. under 155 atmospheres of carbon monoxide pressure for 11 hours. Gas chromatographic analysis of this reaction product found 3-methyl-3-butenoyl chloride.

EXAMPLE 7

To a mixture of 0.093 g. of hydrazobenzene-palladium chloride complex as prepared in Example 1(B) and 9.2 g. of betamethallyl chloride in a 30 ml. reactor was charged carbon monoxide under 100 atmospheres pressure. The reactor contents were heated at 90° C. with shaking for 16 hours. Gas chromatographic analysis found 3-methyl-2-butenoyl chloride.

EXAMPLE 8

0.1 mmole of beta-methallyl chloride and 0.07 mmole of hydrobenzamide-palladium chloride complex were heated at 90° C. under carbon monoxide pressure of 100 atmospheres for 16 hours, to yield 3-methyl-3-butenoyl chloride.

EXAMPLE 9

Added to a 300 ml. stirred autoclave 0.909 g. of N-benzylidene-aniline-palladium chloride complex as prepared in Example 1(A) and 90.6 g. of beta-methallyl chloride. The reactor was closed and carbon monoxide added at 155 atmospheres. The reactor contents were stirred and heated at 90° C. for 11 hours. The excess pressure was then vented and the reaction product filtered to recover the catalyst. Analysis showed 3-methyl-3-butenoyl chloride.

EXAMPLE 10

Added to a 300 ml. stirred autoclave 0.730 g. of azobenzene-palladium chloride complex as prepared in Example 1(G), 48.8 g. of benzyl chloride and 45 ml. of benzene. The reactor contents were stirred and heated at 130° C. for 22 hours under 158 atmospheres of carbon monoxide pressure. At the completion of the experiment, methanol was added to convert any acid chloride to its methyl ester. Methyl phenyl acetate was identified in the reaction product by gas chromatographic and infrared analyses.

EXAMPLE 11

A small pressure reactor was flushed thoroughly with nitrogen and then charged with 1.87 mmoles of N-benzylideneaniline-palladium chloride complex as prepared in Example 1(A) and 0.098 mole of chlorobenzene. The system was closed and pressure to 85 atmospheres with carbon monoxide pressure. After five hours at 200° C. the reaction was discontinued. Analysis confirmed the presence of benzoyl chloride.

EXAMPLE 12

A mixture of 0.28 mmole of azobenzene-palladium chloride complex as prepared in Example 1(G) and 0.15 mole of allyl alcohol were heated at 85° C. for 5 hours under 100 atmospheres of carbon monoxide. Analyses of the reaction product by gas chromatographic and mass spectral methods showed the presence of allyl ether and allyl 3-butenoate.

EXAMPLE 13

A 300 ml. stirred autoclave was charged with 0.490 g. of N-benzylidenemethylamine-palladium chloride complex as prepared in Example 1(C), 5.14 g. of anhydrous cupric chloride and 100 ml. of purified benzene. The reactor was closed and pressured to 68 atmospheres with a 1:1 mixture of ethylene and carbon monoxide. Contents of the reactor were stirred and heated at 75° C. for eight hours. A portion of the reaction product was treated with aniline; the anilide derivative melted at 117° C., the reported melting point for the anilide derivative of 3-chloropropionyl chloride is 116° C. Nuclear magnetic resonance analysis also confirmed the identity of this derivative as the anilide of 3-chloropropionyl chloride.

EXAMPLE 14

29.0 g. of styrene, 70 ml. of benzene, 3.93 g. of cupric chloride and 0.406 g. of N-benzylidenemethylamine-palladium chloride complex were heated at 75° C. for 20 hours under 120 atmospheres of carbon monoxide pressure. A portion of the reaction product was treated with aniline and the anilide derivative isolated and purified. The melting point was 146–147° C. Nuclear magnetic resonance analysis confirmed that 3-chloro-3-phenyl-propionyl chloride was formed during this reaction.

EXAMPLE 15

A 300 ml. Magna stirred autoclave was charged with 0.420 g. azobenzene-palladium chloride complex as prepared in Example 1(G) and 90 ml. of toluene. Ethylene was added to 80 atmospheres at ambient temperature. The temperature was raised to 66° C. and the pressure became 183 atmospheres. After about 18 hours under these conditions, the system was vented through a Dry-Ice trap, yielding 3.7 g. of low boiling material which was shown by gas chromatographic and mass spectral analyses to be a mixture of isomeric butenes.

EXAMPLE 16

N - benzylideneaniline - palladium chloride - potassium cyanide complex prepared in accordance with the procedure of Example 1(H) 0.0322 g. in 10 ml. of toluene was saturated with ethylene to 41 atmospheres at room temperature. The reactor contents were heated at 75° C. for 16 hours. Analysis by gas chromatography identified butene in the reaction products.

EXAMPLE 17

Acrylonitrile (0.15 mole) and hydrazobenzene-palladium chloride complex as prepared in Example 1(B), (0.25 mmole) were heated at 100° for 27 hours. Work-up of the reaction product showed that 2-methylene glutaronitrile and 1,4-dicyanobutene-1 were present. Dilution of the reaction mixture with alcohol yielded no polymer.

EXAMPLE 18

A small reactor containing 0.15 mole of acrylonitrile and 0.26 mmole of azobenzene-palladium chloride complex was heated at 100° C. for 27 hours. Analysis indicated that 2-methylene glutaronitrile, 1,4-dicyanobutene-1 and 1,4-dicyanobutene-2 were present.

EXAMPLE 19

A mixture of 0.832 g. (0.13 mmole) of N-benzylideneaniline-palladium chloride complex and 5 ml. of methyl acrylate (55 mmoles) was stirred and heated at 50–65° C. for 18 hours under a nitrogen atmosphere. Analysis by gas chromatographic methods and comparison with an authentic sample showed that dimethyl dehydroadipate was present in the reaction product.

EXAMPLE 20

10 ml. of allyl benzene, (76 mmoles) and 0.0215 g. (0.029 mmole) of p-dimethylamino-N-benzylideneaniline-palladium chloride complex were placed in a 20 ml. glass tube. The mixture was stirred and heated at 55° C. under nitrogen for five hours. Aliquots were withdrawn periodically and analyzed by vapor phase chromatographic methods to determine the extent of isomerization. Analysis found beta-methylstyrene.

While particular embodiments of this invention are shown above it will be understood that the invention is obviously subject to variations and modifications without departing from its broader aspects.

What is claimed is:

1. In a process for the carbonylation of a compound selected from the group consisting of allylic halides, phenylhalides and benzyl halides with carbon monoxide, the improvement which comprises introducing into said reaction a small but effective amount of a organometallic catalytic agent of the formula:

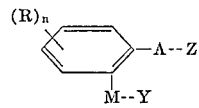

wherein n is an integer of from zero to four, each R is selected from the group consisting of lower alkyl, aryl, hydroxy, halide, dialkylamino, diarylamino, alkarylamino, alkoxy and aryloxy; M is selected from the group consisting of ruthenium, platinum, osmium, palladium, iridium, and rhodium; Y is selected from the group consisting of chloride, bromide, nitrate, acetate, thiocyanate, and cyanide; A is selected from the group consisting of —CR'= N—, wherein R' is selected from the group consisting of hydrogen, lower alkyl and aryl, —NH—NH—,

and —N=N—; and Z is selected from the group consisting of lower alkyl, aryl, R-substituted aryl, wherein R is as defined hereinbefore, alkoxy, aryloxy, hydroxy, alkylamino, dialkylamino, arylamino and diarylamino.

2. The method of claim 1, wherein the organometallic catalytic agent is chloro[o-(N-phenylformimidoyl)phenyl]palladium(II).

3. The method of claim 1, wherein the organometallic catalytic agent is chloro(o-azobenzene) palladium (II).

4. The method of claim 1, wherein the amount of the organometallic catalytic agent is from about 0.001 to about 10.0% by weight of the total reaction mixture.

5. The method of claim 1, wherein M is palladium and Y is halide.

6. The process of claim 1 wherein said carbonylation is carried out at a temperature of from about 50° to 350° C. and a pressure of from about 14 to 4500 p.s.i.g, 7. The process of claim 1 wherein said compound is allyl chloride.

References Cited

UNITED STATES PATENTS 3,450,730   6/1969   Scheben _____ 260—429

LORRAINE A. WEINBERGER, Primary Examiner

E. J. GLEIMAN, Assistant Examiner

U.S. Cl. X.R.

260—465.8, 485, 486, 669, 683.15, 683.9